United States Patent [19]
Treichler

[11] 3,943,968
[45] Mar. 16, 1976

[54] COMBINATION LOCK AND RELIEF VALVE FOR HYDRAULIC SYSTEMS

[75] Inventor: Ernest Treichler, Irvine, Calif.

[73] Assignee: Parker-Hannifin Corporation, Cleveland, Ohio

[22] Filed: Jan. 6, 1975

[21] Appl. No.: 538,923

[52] U.S. Cl. .............. 137/493; 137/495; 137/509; 91/420; 244/78
[51] Int. Cl.² ................ F16K 17/22; F16K 31/12
[58] Field of Search ........... 137/495, 596, 613, 492, 137/596.14, 492.5, 596.18, 596.2, 488, 489, 493, 509; 91/420, 426, 447, DIG. 2; 244/78, 113, 42 D

[56] References Cited
UNITED STATES PATENTS

| | | | |
|---|---|---|---|
| 953,403 | 3/1910 | Turner | 137/489 |
| 1,212,951 | 1/1917 | Higinbotham | 137/509 |
| 3,137,311 | 6/1964 | Rohweder et al. | 137/495 |
| 3,559,534 | 9/1947 | Munro | 91/447 X |
| 3,665,810 | 5/1972 | Parrett | 91/420 |
| 3,792,715 | 2/1974 | Parrett et al. | 137/493 |
| 3,807,443 | 4/1974 | Jacobs | 137/493 X |
| 3,857,404 | 12/1974 | Johnson | 91/420 X |

*Primary Examiner*—Alan Cohan
*Assistant Examiner*—Robert J. Miller
*Attorney, Agent, or Firm*—John N. Wolfram

[57] ABSTRACT

A combination lock and relief valve in which a single valve poppet provides both functions. The combination valve is so arranged that the opening pressure of the poppet as a relief valve is independent of system pressure and remains constant regardless of system pressure variations. Moreover, when the poppet opens as a relief valve while the system pressure is on, the differential pressure across the poppet is relatively small whereby to minimize or eliminate erosion of the valve seat as occurs more readily when relief valve poppets are opened with high pressure differentials thereacross.

11 Claims, 1 Drawing Figure

U.S. Patent    March 16, 1976    3,943,968
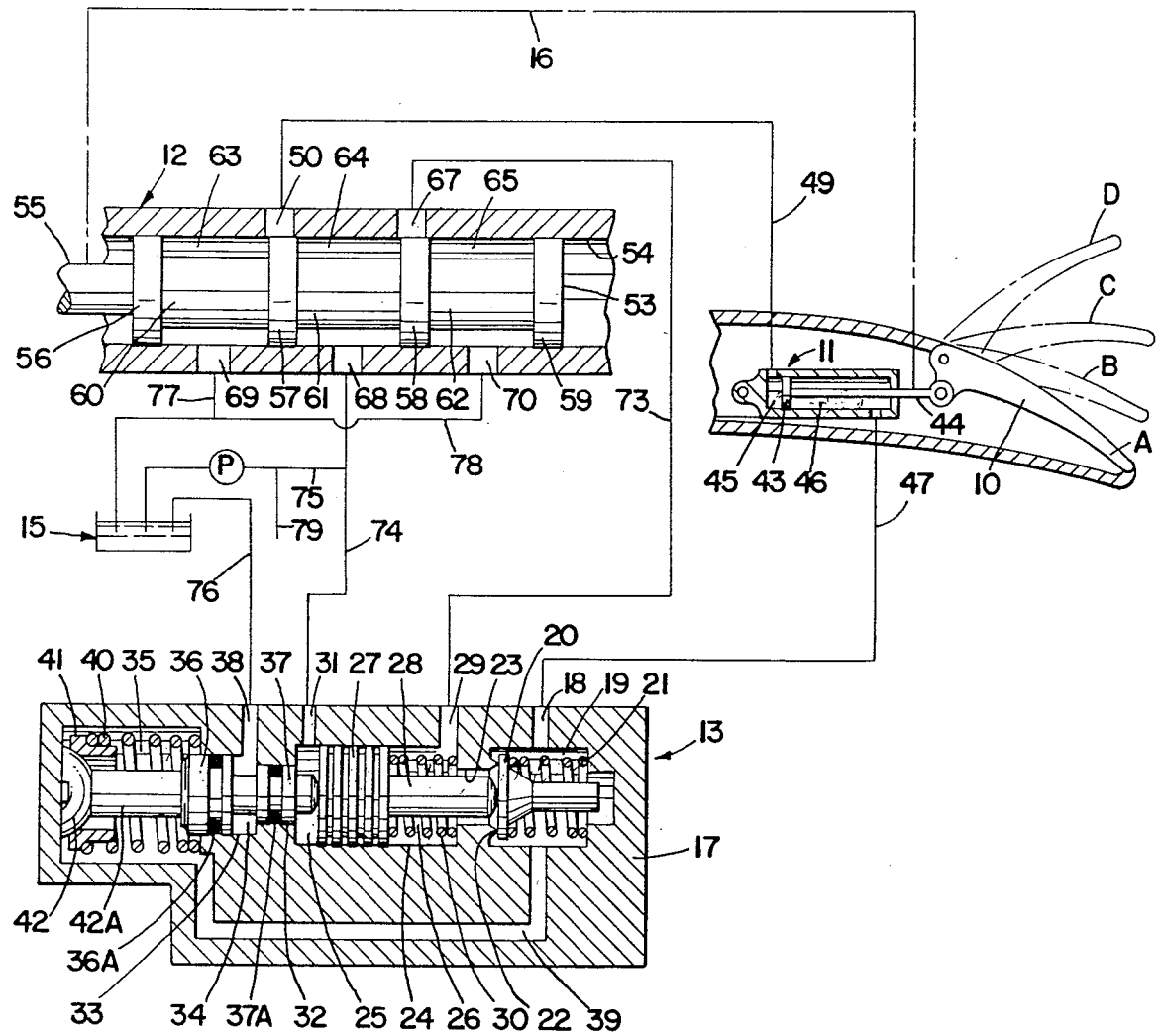

COMBINATION LOCK AND RELIEF VALVE FOR HYDRAULIC SYSTEMS

BACKGROUND OF THE INVENTION

Hydraulic systems for operating spoilers in aircraft employ a piston type hydraulic actuator and a metering valve for alternately directing and exhausting fluid under pressure to and from each side of the actuator piston for extending and retracting the actuator piston rod to cause raising and lowering of the spoiler and also to hold the spoiler in selected positions. It is a known practice in such systems to mount a lock valve between the metering valve and the retract side of the piston to prevent raising of the spoiler by aerodynamic forces thereon in case either system pressure fails or external forces tending to raise the spoiler causes retract pressure to exceed system pressure when the latter is below the normal operating pressure.

It is also a known practice in hydraulic systems to provide a thermal relief valve between the retract side of the actuator piston and the system reservoir for relieving excess pressure on the retract side of the piston caused by thermal expansion of the hydraulic fluid when the lock valve is closed. The thermal relief valve may also function as an overload relief valve to relieve excess fluid pressure in the retract side of the piston generated by forces on the spoiler tending to extend the piston when the lock valve is closed.

In such known practice the relief valves have been arranged so as to be always subject to the full differential between reservoir pressure and the desired relief pressure. Thus, in a 3,000 PSI working pressure system the relief valve opening pressure may be set at 3,800 PSI. Because reservoir pressure is near zero there is always about 3,800 PSI differential across the relief valve when it opens. This results in high velocity flow across the relief valve seat each time the relief valve opens which in turn causes rapid erosion of the seat resulting in constant leakage when the relief valve is closed.

During flight of the aircraft while hydraulic system pressure is utilized for holding the spoiler down, aerodynamic forces on the spoiler will tend to raise it. Frequently this imposes enough extending force on the actuator piston to raise the pressure on the retract side close to, or even higher than, system pressure when the latter has been temporarily reduced due to flow demand of other components of the hydraulic system. When this occurs the lock valve closes to trap the fluid in the retract chamber and prevent extension of the piston and raising of the spoiler. However if, due to surges in the system pressure, the pressure in the retract side pulses to a pressure that exceeds the opening pressure of the relief valve, the latter will open to prevent a further rise in pressure in the retract chamber. The pressure in the retract chamber may pulse to the relief pressure many times during a flight and this may result in rapid erosion of the seat and leakage across the relief valve as aforesaid. If for any reason the system pressure should then fail during flight there will be loss of fluid across the relief valve from the retract side of the actuator piston and the spoiler can then raise and/or flutter with possible disastrous consequences to the aircraft.

SUMMARY OF THE INVENTION

The present invention combines a hydraulic system relief valve and a lock valve in such a manner that a single valve poppet cooperating with a single valve seat provides both functions. The poppet is arranged and balanced so that its opening as a relief valve is at a predetermined pressure in the retract chamber and is independent of system pressure. Thus, when system pressure is at either its normal high level or at a reduced level there is only a small differential in the pressures across the relief valve when the latter opens whereby rapid erosion of the relief valve seat and leakage of the relief is avoided.

The lock valve function of the single valve poppet is accomplished through use of a lock valve piston having a relatively light spring for opposing actuation of the piston for opening the poppet whereby only a relatively small excess of system pressure over retract pressure is required for overcoming the spring to cause the lock valve piston to open the poppet.

The relief valve function of the single valve poppet is accomplished through use of relief valve piston having a relatively heavy spring for opposing actuation of such piston for opening the poppet so that hysteresis between opening and closing pressures due to friction of seals on the relief valve piston will be minimized.

DETAIL DESCRIPTION

The drawing is a schematic view with the combination lock and relief valve of the present invention shown in cross section and as installed in a simplified hydraulic system for operating an aircraft spoiler.

In the simplified system as illustrated, there is an aircraft spoiler 10 actuable to extended and retracted positions by a hydraulic piston type actuator 11 under the control of a metering valve 12 and a combination lock and relief valve 13 with hydraulic fluid provided under pressure by a pump P from a supply reservoir 15. A position feed back device 16 connects actuator 11 to valve 12.

The combination lock and relief valve 13 comprises a body 17 having an actuator port 18 leading to a valve chamber 19 in which a valve poppet 20 is pressed by a light spring 21 toward a valve seat 22 that surrounds a bore 23 that is connected to a lock cylinder 24 divided into lock chambers 25, 26 by a lock valve piston 27 having a rod 28 extending from one side thereof into bore 23. An actuator port 29 connects to chamber 26 and a spring 30 presses piston 27 in a direction away from poppet 20. Chamber 25 connects with a system or high pressure port 31 and a bore 32 that leads to a relief cylinder 33 divided into relief chambers 34, 35 by a relief valve piston 36 sealed in cylinder 33 by a packing 36A and having a rod portion 37 that is sealed in bore 32 by a packing ring 37A.

Chamber 34 connects to an exhaust port 38 and chamber 35 is connected to chamber 19 by a passage 39. The diameter of valve seat 22 is the same as the diameter of rod portion 37 but is smaller than the diameter of piston 36. A heavy spring 40 bears against a follower 41 that in turn bears on a frusto-spherical surface 42 on an extension 42A of piston 36 to urge this piston in a direction away from piston 27.

The difference in areas of piston 36 at its packing 36A and its rod portion 37 at packing 37A and the sum of the forces of springs 21, 30 and 40, as well as friction of packings 36A and 37A, determine the opening pressure of poppet 20 as a relief valve. However, the force of spring 21 which may be only ½ pound, and the friction force of the packings are quite small so that as a practical matter they can be disregarded in the lock valve and relief valve functions.

Actuator 11 has a piston 43 therein connected to spoiler 10 by a rod 44. Piston 43 divides the interior of actuator 11 into an extend chamber 45 and a retract chamber 46. A conduit 47 connects the retract chamber 46 to actuator port 18. Another conduit 49 connects extend chamber 45 of the actuator to an extend port 50 in metering valve 12.

Metering valve 12 has a spool 53 in a bore 54, an operating stem 55 and a series of spaced lands 56, 57, 58 and 59 separated by reduced diameter portions 60, 61, 62 that provide flow chambers 63, 64 and 65 between the lands that respectively connect with exhaust port 69, supply port 68 and exhaust port 70. Spool 53 has a null position, as shown, in which land 58 just slightly opens retract port 67 to supply port 68 and slightly opens extend port 50 to exhaust port 69. From the null position, spool 54 may be moved either to the left or to the right as hereinafter described.

Ports 29, 31 and 38 of combination valve 13 are respectively connected by conduits 73, 74–75 and 76 to metering valve retract port 67, pump P and reservoir 15. Metering valve supply port 68, and exhaust ports 69 and 70 are respectively connected by conduits 74–75, 77–78 and 78 to pump 14 and reservoir 15. A conduit 79 leads from conduit 75 to other components, not shown, in the hydraulic system serviced by pump P.

Operation

Operation of the system and combination valve will be described with the assumption that the system working pressure is 3,000 PSI and that the relief valve is set to open at 3,800 PSI. However, system pressure at times may be less than 3,000 PSI due to simultaneous operation of other system components connected to conduit 79, or due to other causes.

When the aircraft is on the ground with spoiler 10 down and pump P shut off after a previous pressurization of the system, there will be no significant fluid pressure in the system except that there will be high pressure in valve chamber 19, relief chamber 35, retract chamber 46, and in the conduits and passages connecting these chambers. Lock piston 27 will be held to the left by spring 30 and poppet 20 will be closed. The high pressure in relief chamber 35 will not overcome spring 40 and relief piston 36 will be to the left, as shown. If fluid in retract chamber 46 becomes heated and expands to increase its pressure to 3,800 PSI, this pressure is transmitted via line 47 to valve chamber 19 and passage 39 to relief chamber 35 where it overcomes springs 40 and 30 and moves both pistons 36 and 27 to the right to open poppet 20 to relieve the 3,800 PSI by passing fluid from chamber 19 into chamber 26.

With pump P energized, and with spoiler 10 fully retracted, the feed back control 16 positions spool 53 to the right for opening retract port 67 to pressure port 68 and extend port 50 to exhaust port 69. This puts system pressure into chambers 26, 19 and 46, but because piston 43 is fully retracted there will be no flow and poppet 20 remains closed by action of spring 21. There is also system pressure in lock chamber 25 that is balanced by system pressure in chamber 26 so that spring 30 retains the lock piston to the left. Relief piston 36 also remains to the left. This is the condition of the system at takeoff.

During flight the pilot may actuate his steering control for turning and banking the aircraft. This automatically causes spool 53 for a corresponding spoiler 10 to move to the left a predetermined amount proportional to the steering movement by a mechanism not shown. This opens extend port 50 to supply port 68 to pressurize extend chamber 45. At the same time retract port 67 opens to exhaust port 70 to drop the pressure in retract chamber 46. Actuator piston 43 then moves to the right to start raising spoiler 10 to a predetermined raise position B corresponding to the amount of steering movement. When steering movement is stopped, spool 53 automatically returns toward a null position until it reaches a position in which it bleeds just enough pressure into extend port 50 and extend chamber 45 for maintaining the spoiler in the predetermined raise position B of the spoiler despite aerodynamic loads thereon tending to lower the same.

Thus, for example, with a 1,000 pound retracting force applied to piston 43 by the aerodynamic load on the spoiler and assuming that system pressure is at 3,000 PSI, and taking into account the differential in effective areas on opposite sides of piston 43 because of rod 44, the fluid pressure in extend chamber 45 may be 2,200 PSI while the pressure in retract chamber 46 may be 800 PSI for maintaining the spoiler at position B. At this time lock valve piston 27 remains to the right for keeping valve 20 open because pressure in chamber 25 is 3,000 PSI and in chamber 26 it is 800 PSI. Also, relief valve piston 36 is maintained to the left by the 3,000 PSI in chamber 25 versus 800 PSI in chamber 35.

When the pilot operates the steering control to resume straight flight, spool 53 is automatically moved to the right to open retract port 67 to supply port 68 and to open extend port 50 to exhaust port 69. This pressurizes retract chamber 46 via lines and ports 73, 29, 18 and 47 and exhausts extend chamber 45 so that the spoiler retracts to position A. Lock valve piston 27 remains to the right and relief valve piston 36 to the left. Upon retraction of the spoiler, spool 53 is automatically moved by feed back device 16 toward its null position as shown, wherein it maintains retract port 67 slightly open to supply port 68 and extend port 50 slightly open to exhaust port 69. In this position of spool 53 there will be a slight flow of pressurized fluid from supply port 68 to retract port 67 to pressurize lines 73, 39, 47 and actuator retract chamber 46. Because piston 43 is in retract position, there will be no flow of fluid into retract chamber 46. Instead, there will be a bleed of fluid from port 67 past land 58 to exhaust port 70. However, pressure builds up in port 67 and hence in chambers 26, 19 and 46 because the resistance to flow from port 67 to exhaust port 70 is greater than resistance to flow from supply port 68 to port 67. At this time, system pressure in chamber 25 is greater than bleed pressure in chamber 26 and lock valve piston 27 is maintained in a rightward position in which it keeps poppet 20 unseated. Also, relief valve piston 36 is maintained in the leftward position, as shown, in which it is non-functional. Because at this time fluid bleeds from actuator port 50 to exhaust port 69 faster than it can bleed into port 50 from supply port 68, the pressure in port 50, and hence it extend chamber 45 is lower than pressure in retract chamber 46 so that piston 43 is in retract position with spoiler 10 maintained in down position A.

During straight flight, while the spoiler is retracted, there will be aerodynamic forces exerted thereon tending to raise the same. This puts a force on piston 43 tending to extend the same and such force may cause the fluid pressure in chambers 46 and 19 to approach and possibly exceed the system pressure in conduit 73 while the system pressure is lower than 3,000 PSI due to operation of other components of the system. When pressure in chambers 46 and 19 rises in this manner to the point where it is within 77 PSI of system pressure, spring 30 moves lock valve piston 27 to the left and poppet 20 closes. If the pressure in retract chamber 46 should reach 3,800 PSI while poppet 20 is closed, this same pressure will be transmitted via lines 47, chamber 19 and passage 39 to chamber 35 on the left side of piston 36 and cause it to move to the right and unseat poppet 20 via piston 27 and rod 28. This permits the pressure in chambers 46 and 19 to be relieved into chamber 26 across valve seat 22 so that it will not exceed the predetermined relief pressure of 3,800 PSI.

Because there is pressure in chamber 26 when poppet 20 opens due to a 3,800 PSI pressure in chamber 19, the differential in pressure across poppet 20 when it opens as a relief valve with the hydraulic system energized is considerably less than 3,800 PSI (it may be as low as 800 PSI when pressure in chamber 26 is 3,000 PSI) and therefore valve seat 22 is not subject to as high velocity fluid flow thereacross as occurs in prior systems where the pressure differential would always be 3,800 PSI whenever the relief valve opens. Consequently erosion of seat 22 by relief flow thereacross is either eliminated or greatly reduced so that the seat will have a much longer life before leakage will occur with poppet 20 closed.

If during flight system pressure should fail because of pump failure, bursting or leakage from conduit 77, or other reasons, no pressure will be delivered to conduit 73, chamber 26 and retract chamber 46 for holding the spoiler down. Now when aerodynamic forces tend to raise the spoilers and extend piston 43, pressure will be exerted upon the fluid in retract chamber 46 and be reflected in chamber 19 on the right side of poppet 20 to close the same and in chamber 35 to the left of piston 36. As long as this pressure is less than 3,800 PSI it will hold poppet 20 closed to trap fluid in chamber 46 and prevent extension of piston 43 and raising of spoiler 10. If this pressure builds up to 3,800 PSI piston 36 will move to the right to momentarily unseat poppet 20 to relieve the pressure until it drops to about 3,400 PSI, at which time poppet 20 will again close.

If seat 22 had become eroded so that poppet 20 could not completely close upon loss of system pressure and imposition of extending force upon piston 43 as aforesaid, there would be loss of fluid from chamber 46 and spoiler 10 could raise and/or flutter, both of which conditions are highly undesirable during flight and which could have disastrous consequences.

When the aircraft is to be landed, the spoilers are raised about 30° to position C to act as speed brakes for slowing the aircraft. To do this, metering valve spool 53 is moved to the left by a separate control for this purpose so that passage 64 will connect inlet port 68 with cylinder port 50 and passage 65 connect cylinder port 67 with exhaust port 70. This causes rod 44 to extend to raise the spoiler. When position C is reached, spool is automatically caused to return to the null position shown and maintains the spoiler in position C in the same manner as described above for maintaining the spoiler in position B when turning and banking. With the spoiler in position C, it may be modulated to higher or lower positions during turning and banking as before.

Upon landing of the aircraft and to slow its speed on the runway, the spoilers are raised 60° to position D by moving of spool 53 to the left with the separate control to pressurize extend chamber 45 and exhaust chamber 46. At this time the spool does not automatically return to null position because modulation is not required.

After the aircraft has been sufficiently slowed on the runway, metering valve spool 53 is moved to the right by the separate control and fluid under pressure will be delivered to chamber 46 and fluid will be exhausted from chamber 45 for retracting piston 43 to lower the spoiler to a fully retracted position slightly below position A. The feed back system 16 will then automatically retain spool 53 in the rightward position and pressure in chambers 26, 19 and 46 will become equal to system pressure in chamber 25 and spring 30 will move piston 27 to the left and poppet 20 will close.

Spring 30 exerts a relatively low force, such as 15 pounds, on piston 27 so that the pressure differential between chambers 25, 16 for overcoming the spring for moving piston 27 to the right for opening valve 20 will be corresponding low, such as about 77 PSI. This is for greater assurance that a reduced system pressure will supply enough force for opening valve 20 when modulation of the spoiler position is required. On the other hand spring 30 must be strong enough to readily move piston 27 to the left and permit valve 20 to close when pressure in retract chamber 46 approaches system pressure. Thus, a spring 30 of 15 pounds force may be utilized with a piston 27 of a diameter for which 77 PSI differential of pressures in chambers 25, 26 will overcome the spring. In such case poppet 20 will close when pressure in chambers 46, 19 and 26 comes within 77 PSI of system pressure in chamber 25 and will open when system pressure is more than 77 PSI greater than in chambers 46, 19 and 26. To help keep the force of spring 30 relatively low a lap fit is used as a seal between piston 27 and the wall of cylinder 25 so that there is little or no friction to overcome for moving the piston. A lap fit is permissible on piston 27 because minor leakage thereacross will not preclude proper function of the unit as a lock valve.

Spring 40 exerts a relatively high force on piston 36, as for example 175 pounds. This force is relatively high in relation to friction force of packings 36A and 37A in order to readily overcome sliding and breakout friction of these packings and to minimize resultant hysteresis or spread between opening and closing pressures of poppet 20 when it functions as a relief valve. Moreover, the difference between opening and reseat pressures in chamber 35 will not vary greatly even though there is a large percentage increase in the packing sliding or breakout friction, as may occur over long periods of use and/or non-use. Thus, with spring 30 exerting about 15 pounds of force and spring 40 exerting 175 pounds of force, the diameters of piston 36 and rod 37 are proportioned so that the differential area thereof will require about 3,800 PSI in chamber 35 to move pistons 36 and 27 to the right for opening poppet 20 and wherein springs 30 and 40 will move the two pistons to the left to permit reseating of poppet 20 when the pressure in chamber 35 drops to about 3,400 PSI.

A lap fit cannot be used in place of packing 36A because it does not provide zero leakage thereacross.

Leakage across packing 36A would drain fluid from retract chamber 46 to reservoir via line 47, chamber 19, passage 39, chamber 35 and line 76 when poppet 20 is closed and defeat the purpose of the latter as a lock valve.

When pump P is turned off and the system depressurized, poppet 20 will be closed by spring 21 and fluid will be trapped in retract chamber 46 and in chambers 19 and 35. If this trapped fluid should now undergo thermal expansion so as to raise the pressure thereof to 3,800 PSI, piston 36 will move to the right to cause piston 26 to open poppet 20 for relieving the trapped pressure. Thus, because seat area 22 is the same as the area of piston rod portion 37 the relief pressure will be the same regardless of whether pump P is energized or deenergized.

If it is desired to have different relief pressures for the energized and deenergized conditions of the system, the area of seat 22 is made different than that of piston portion 37. In such case, if the area of piston portion 37 is made smaller than the area of seat 22 the relief pressure will be lower than the system is energized than when deenergized, and vice versa. Also, the relief valve setting can be varied by connecting line 76 to some other reference pressure, such as atmosphere or a separate predetermined pressure source, rather than to the hydraulic system reservoir 15.

Although the combination valve has been illustrated and described in connection with actuation of an aircraft spoiler and for a 3,000 PSI working pressure with 3,800 PSI relief pressure, the valve may be used in other hydraulic system applications and the working and relief pressure varied as desired.

I claim:

1. A combination lock and relief valve comprising a housing having a valve chamber, a lock cylinder and a relief cylinder, a lock piston dividing the lock cylinder into first and second lock chambers, a relief piston dividing the relief cylinder into first and second relief chambers, said first lock chamber communicating with said valve chamber, a valve poppet movable in said valve chamber for opening and closing the valve chamber relative to said first lock chamber, a first actuator port connected to the valve chamber, a second actuator port connected to said first lock chamber, said first actuator port at times serving as an inlet for fluid and at other times as an outlet for fluid, said second actuator port serving as an outlet for fluid when said first actuator port serves as an inlet and serving as an inlet for fluid when the first actuator port serves as an outlet, a high pressure port connected to the second lock chamber, an exhaust port connected to the first relief chamber, a passage connecting the second relief chamber to the valve chamber, said lock piston being movable by high pressure in said second lock chamber into engagement with said valve poppet for moving the latter to open position, and said relief piston being movable by pressure in said second relief chamber into engagement with said lock piston to move the latter into engagement with said poppet for moving the poppet to its open position.

2. The valve of claim 1 in which there is a bore between said second lock chamber and said first relief chamber and said engagement of said lock piston by said relief piston is through said bore.

3. The valve of claim 2 in which said bore is of smaller diameter than said relief piston and said relief piston has a rod extending through said bore to engage said lock piston.

4. The valve of claim 1 in which said relief piston has a first area exposed to fluid in said second relief chamber and has a second area exposed to fluid in said first relief chamber, and said relief piston has a third area exposed to fluid in said second lock chamber, said first area being greater than said third area and said second area being equal to the difference in said first and third areas.

5. The valve of claim 1 in which the relief piston has an effective area exposed to fluid in said second lock chamber and said poppet has an effective area exposed to fluid in said valve chamber, and said effective areas are equal.

6. The valve of claim 1 in which there is a lock spring urging the lock piston in a direction away from the poppet and there is a relief spring urging the relief piston in a direction away from the lock piston.

7. The valve of claim 6 in which said relief spring exerts more force than the lock spring.

8. The valve of claim 6 in which the relief piston includes a rod extending toward the lock piston for engaging the same and includes a flange in the second relief chamber against which said relief spring bears.

9. The valve of claim 8 in which the flange has a frusto-spherical surface and the relief spring bears against the flange by way of a follower sleeve between the relief spring and said surface.

10. The valve of claim 1 in which a packing ring seals the relief piston relative to a wall of said relief cylinder.

11. The valve of claim 3 in which there is a packing that seals the relief piston relative to a wall of said relief cylinder.

* * * * *